United States Patent [19]
Alioto

[11] Patent Number: 5,788,552
[45] Date of Patent: Aug. 4, 1998

[54] EDUCATIONAL DEVICE FOR TEACHING THE SEVERELY MENTALLY RETARDED

[76] Inventor: Frank J. Alioto, P.O. Box 92243, Lakeland, Fla. 33804

[21] Appl. No.: 566,059

[22] Filed: Dec. 1, 1995

[51] Int. Cl.[6] ............... A63H 33/04; A63H 33/12
[52] U.S. Cl. .............. 446/85; 446/103; 446/118; 446/122; 446/126; 434/256
[58] Field of Search ............... 446/85, 103, 105, 446/108, 122, 123, 126, 118, 95; 434/258, 259

[56] References Cited

U.S. PATENT DOCUMENTS

| 228,052 | 5/1880 | Frost | 446/126 |
|---|---|---|---|
| 1,198,263 | 9/1916 | Pajeau | 446/126 |
| 1,863,320 | 6/1932 | Ankeltell | 446/103 |
| 2,014,464 | 9/1935 | Bierbach | 446/123 |
| 2,088,128 | 7/1937 | Benjamin | 446/95 |
| 2,313,357 | 3/1943 | Pajeau | 446/122 |
| 2,568,557 | 9/1951 | Newberry | 446/122 |
| 2,674,827 | 4/1954 | Schaper | 446/126 |
| 2,709,318 | 5/1955 | Benjamin | 446/103 |
| 4,458,441 | 7/1984 | Bril | 446/94 |

FOREIGN PATENT DOCUMENTS

| 97534 | 7/1924 | Austria | 446/122 |
|---|---|---|---|
| 1002759 | 1/1977 | Canada | 446/122 |
| 1138774 | 1/1902 | Germany | 446/103 |
| 3601946 | 7/1987 | Germany | 446/122 |
| 441694 | 4/1948 | Italy | 446/123 |
| 371638 | 4/1932 | United Kingdom | 446/122 |
| 537442 | 6/1941 | United Kingdom | 446/123 |
| 589328 | 6/1947 | United Kingdom | 446/95 |
| 739535 | 11/1955 | United Kingdom | 446/95 |
| 2205046 | 11/1988 | United Kingdom | 446/123 |

OTHER PUBLICATIONS

Gilbert Industries, Inc., Young Erector, New York Times Magazine, p. 114, Nov. 1973.

*Primary Examiner*—R. A. Hafer
*Assistant Examiner*—Laura Fossum

[57] ABSTRACT

This educational device has been specifically developed so that a severely mentally disabled person can build simple and compound machines that are used in the teaching of basic mechanics.

The four elements-building units, linkages, connector-strips and a special supporting base called a linkage-box, are capable of being united even though the disabled person may also have severe physical disabilties in hand and arm movements.

As the machines are built, the disabled person is also having a three dimensional real life experience with concepts such as, "force", "weight", "mechanical advantage", pulley, wheel, axle, velocity, rotation, directionality and cause and effect relationships.

The knowledge and skills developed can also find practical application in the vocational, residential and recreational settings.

2 Claims, 5 Drawing Sheets

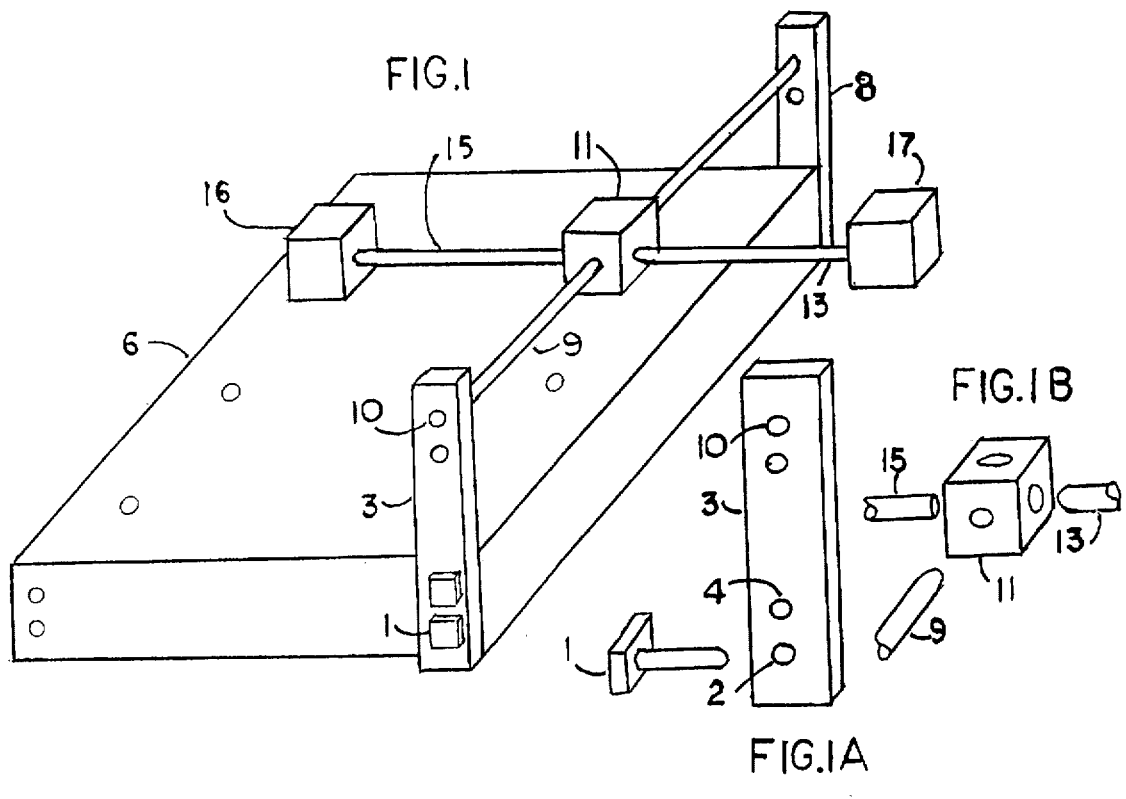
FIG.1
FIG.1B
FIG.1A
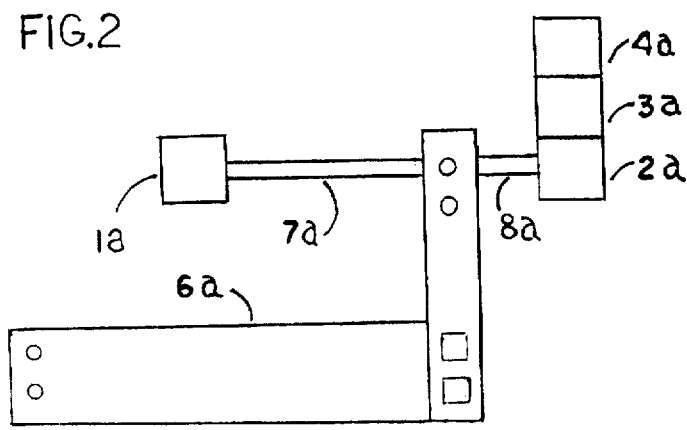
FIG.2
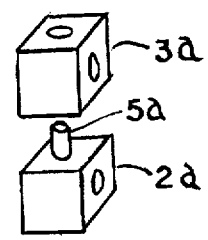
FIG.2A

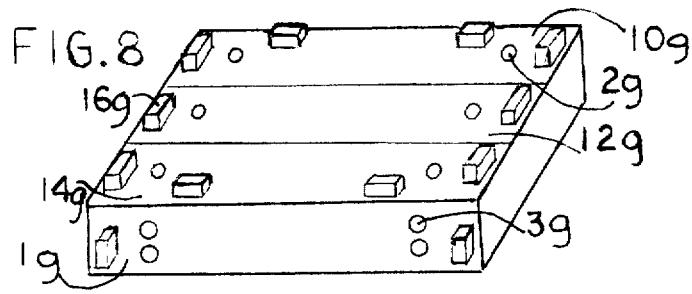
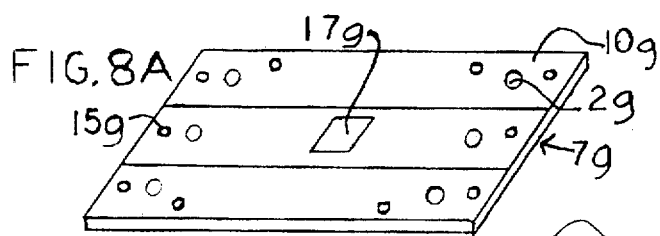
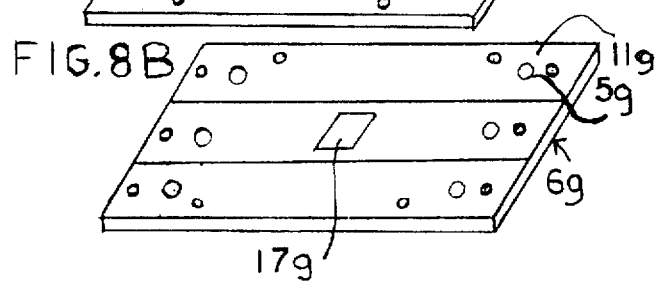
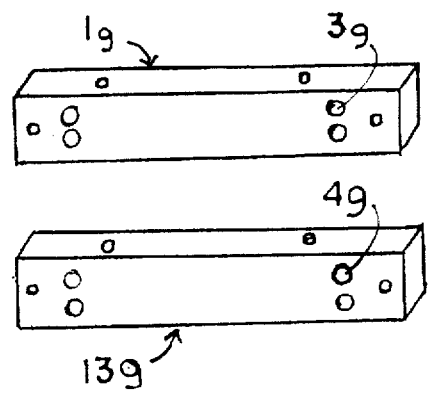
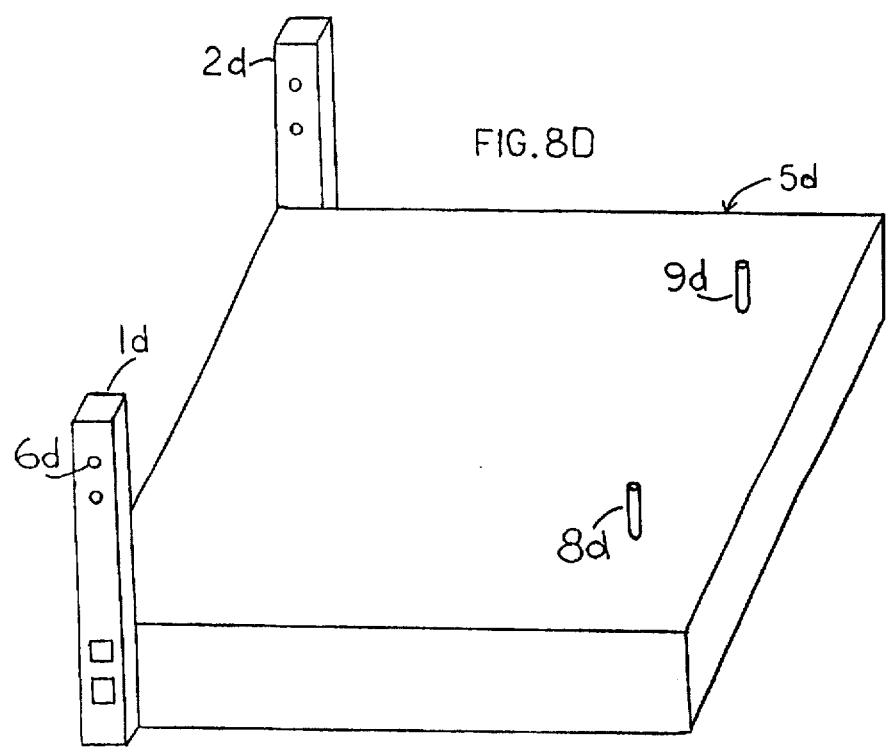

EDUCATIONAL DEVICE FOR TEACHING THE SEVERELY MENTALLY RETARDED

FIELD OF THE INVENTION

This invention relates to the field of educational devices used in the teaching of academical subjects, specifically, science and fundamentals of basic mechanics. This device is specially developed to meet the educational needs of the severely mentally handicapped with severe physical handicaps.

DESCRIPTION OF PRIOR ART

In a search of the patents in the field of educational devices, the inventor did not discover any patents which fulfilled all the objectives required by this sepecial device. The following reasons help to explain why this condition exists.

1. Historical attitudes toward the severely mentally handicapped

Previous to the recent Federal laws related to the mentally retarded, the severely mentally handicapped were usually living in large tax-supported institutions. They were given "custodial care"—only basic necessities of life—food, clothing and shelter. They were not considered capable of working productively in society.

However, more enlighened attitudes developed and the Federal Law of 1975 made it mandatory for every mentally retarded person to receive appropriate education and training. In the 1980's, some literature became available for teaching the severely mentally handicapped. The need for educational devices, therefore, is only a recent development.

2. Low intelligence level

Since the intelligence quotient is approximately 33, the educational device would have to be understood by a child with a mental age of 3 or 4 years, if the chronological age was 9 or 12 years. Because of brain injuries, the usual skills in perception, decision-making, understanding of concepts such as weight, force, distance and so on, were severely impaired. A device which reveals these specific deficiencies and provide experiences which would strengthen them, was needed.

3. Severe physical handicaps

Because of these brain injuries and other factors, there also existed severe limitations in finger dexterity, wrist movement, eye-hand coordination and arm extension.

4. Little or no skill in reading, writing or speech

In a regular classroom, the instructor can discover the level of skills and comprehension through reading, written or oral tests. However, with the severely mentally retarded this is not usually possible. A device which which can measure the performance of the student with these handicaps was needed. If this is not done immediately, mistakes become repeated and eventually frustration develops and an unconscious resistance to the learning process in general.

5. Limitations of computers as teaching device with severely handicapped.

Limiting educational devices to only computers could lead to serious omissions and possible negative effects when used by the severely mentally handicapped with severe physical handicaps.

Research in the medical and psychological fields, related to brain injury, has shown that real three-dimensional life experiences are essential for development in the mental and physical areas. Concepts such as "force", weight, "push vs. pull" need to be felt and experienced in order to be understood. With the severely mentally handicapped, these must usually be taught.

SUMMARY OF THE INVENTION

This educational device comprises four elements which are assembled and disassembled by the severely mentally handicapped to form machines and other structures that are used in teaching basic mechanics.

These four elements—building units; linkages; connector-strips; and a special supporting base (linkage-box); are as follows:

1. Building units which have one or more apertures in the faces of the unit in order to accomodate linkages.

2. Linkages which are a means of joining these building units to each other and to the other elements.

3. Connector-strips which are a part of the linkage-box and connect the structures to the supporting base.

4. A linkage-box which holds the connector-strips in a special manner and has apertures on its surface which accomodate linkages.

The fixed relationships between the connector-strips, which protrude above the linkage-box, and the apertures on the top surface of the box, makes it possible for the severely mentally handicapped person to build simple and compound machines. Gears, wheels, and pulleys are also built by joining linkages with cylindrically shaped building units.

Concepts such as "force, weight, distance, mechanical advantage, lever, machine, velocity, directionality, are taught as structures are built.

Among the many advantages to this educational device are the following:

1. Prepares the student for the world of work by increasing communication, vocational and daily living skills.

2. Reduces the number of personnel needed to supervise and instruct the severely mentally handicapped.

3. Reduces the amount of tax money needed for educating and training the handicapped.

4. Improves the student's ability to reason logically.

5. Improves the overall physical skills of the handicapped in specific areas such as finger manipulation, eye-hand coordination and extension of arms.

6. Provides three-dimensional real hands-on experiences.

BRIEF DESCRIPTION OF THE DRAWINGS

FIG. 1 shows a lever which has been constructed by uniting the four elements of the invention. FIGS. 1A and 1B are enlargements of connector-strip 10 and the fulcrum system, as found in FIG. 1.

FIG. 2 is another lever which is used to teach the concept of mechanical advantage. FIG. 2A shows how the building units 2a and 3a are united vertically by linkage 5a.

FIG. 8D shows the basic parts and their relationships in the linkage-box which is used for support and stability.

FIG. 8, 8A, 8B and 8C, show a special linkage-box where the top and bottom panels can be removed and replaced by panels which have apertures of a different diameter, shape or number.

DETAILED DESCRIPTION OF THE INVENTION

This educational device consists of four elements—building units, linkages, connector-strips and a special supporting base called a linkage-box. These were specifically developed so that a severely mentally handicapped person with severe physical disabilities could build simple and compound machines. As the person uses these elements to construct machines, the basic concepts of mechanics are taught, such as, "force", "weight", "push vs. pull", "rotation", "directionality", "balance", mechanical advantage, velocity, lever, pulley, gear, wheel and axle and so on.

Figure 5:
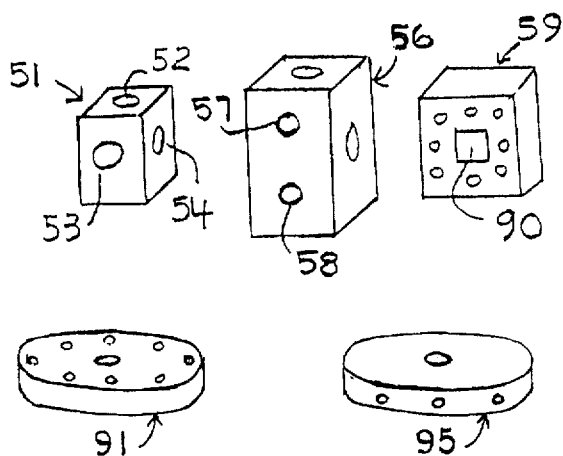
FIG. 5 shows a variety of the building units which are used in the construction of the simple and compound machines.

In FIG. 5, a plurality of building units are shown with different structural characteristics. Building unit 51 has one aperture on each face, 52, 53 and 54, so that structures can be built in all of the three spatial dimensions. Unit 56 has two apertures on one face in order to match similar apertures on a connector-strip. To hold the end of linkage rigidly in an aperture, unit 59 shows a square aperture 90 in the center. Building units are either polyhedron or cylindrical in shape. Unit 91 cylindrical, has apertures on the surface spatially arranged so that pulleys and gears can be formed. The unit 95 has apertures on the circumference so that another type of gear can be constructed by inserting linkages therein.

Figure 6:
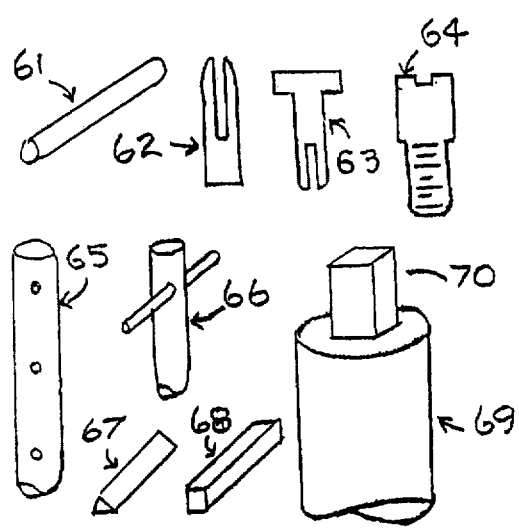
FIG. 6 depicts the various types of linkages which are used.

In FIG. 6, a variety of linkages are shown. Linkages 61, 67 and 68 have different cross-sections—circular, triangular and square. Linkages 62 and 63 are slotted on one end so that they may be easily inserted and removed from apertures. Linkage 66 has an aperture on the end so that a linkage can be inserted and serve as a cotter pin. The linkage 65 has three apertures so that gears or wheels can be fixed at different lengths along an axle. The cross-sections of the linkage may vary. Linkage 69 has an end with a square cross-section so that the linkage may be held fixed when inserted into a square aperture.

A special linkage-box, 5d in FIG. 8D, shows two connector-strips, 1d and 2d already attached to the box. These strips have been specifically aligned to each other. They are on opposite sides, parallel to each other, and in exactly the same positions. In addition, the two linkages 8d and 9d, have been inserted in apertures which are also spatially aligned. An axle inserted in aperture 6d of connector-strip 1d will always be parallel to an axle joining building units attached to the linkages 8d and 9d. This will make it possible to connect sub-systems properly with a minimum of decision-making. The compound machine shown in FIG. 3 was constructed with this type of linkage-box.

Figure 8E:
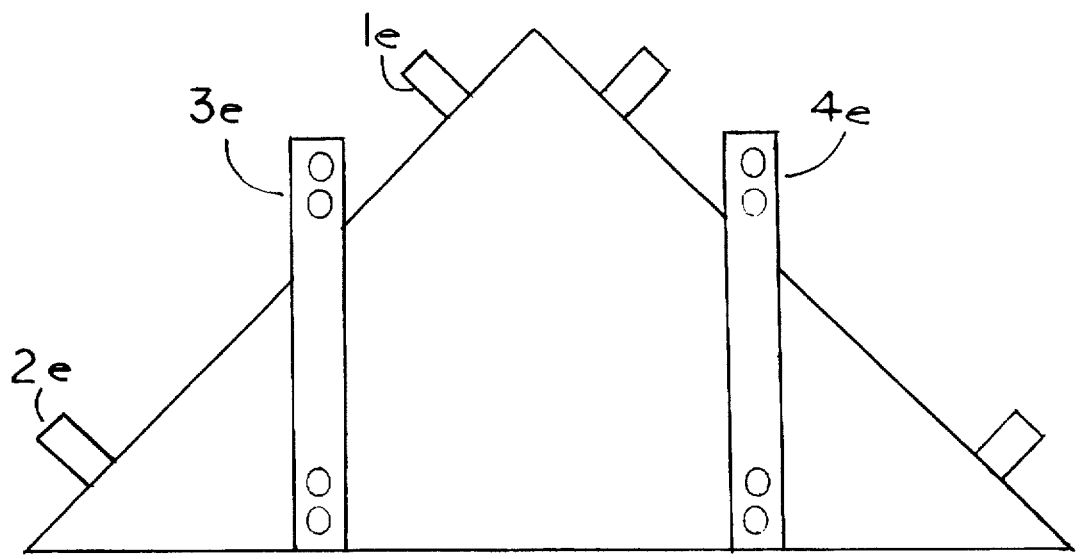
FIG. 8E is another linkage-box with a different number of sides and a different shape.

FIG. 8E shows a linkage-box with a different shape, yet the relationships between connector-strips 3e and 4e with building units 1e and 2e are the same.

Figure 8F:
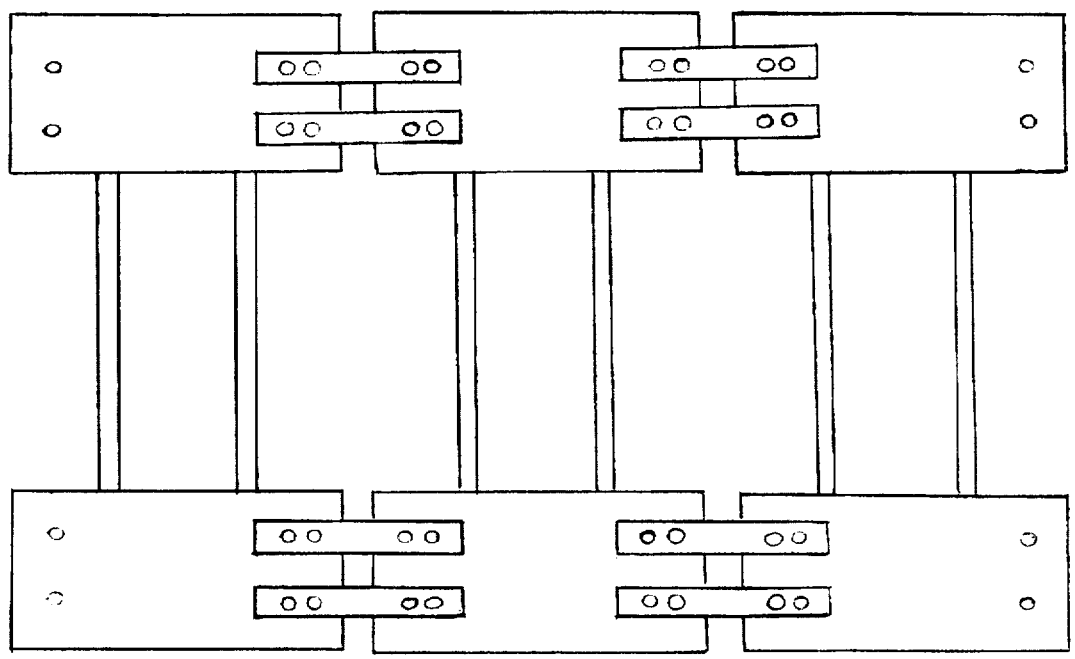
FIG. 8F shows how linkage-boxes can be united to form more complex structures.

FIG. 8f shows how a number of linkage-boxes may be connected to form more complex machines and structures.

To give greater flexibility to the linkage-box, a special type is shown in FIGS. 8, 8A, 8B, and 8C. In FIG. 8, the top panels of linkage-box 9g, namely, 10g, 12g and 14 g can be removed and replaced with other panels having apertures with different shape, diameter or number. In this embodiment, the panels are removed by taking out the pegs 16g from apertures 15g (FIG. 8A). In FIGS. 8A and 8B the panels 10g and 11g remain the same, but the middle panels have been replaced by panel 7g on the top and panel 6g on the bottom. The square aperture 17g has been added to both panels so that additional structures could be built. FIG. 8C shows two of the sides 1g and 13g, with apertures 3g and 4g respectively.

Figure 7:
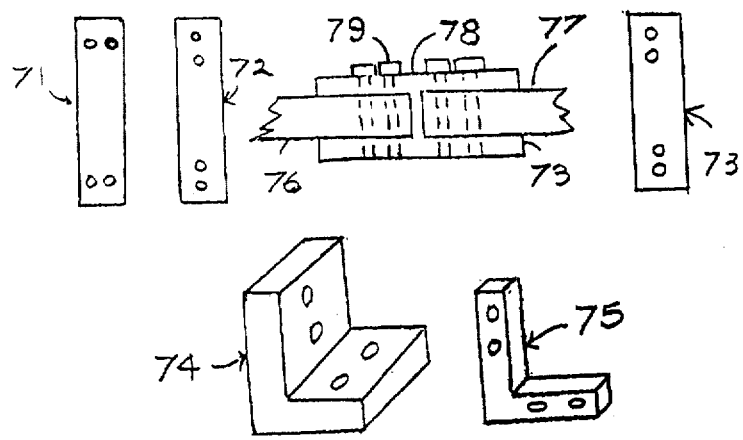
FIG. 7 gives a sample of the different types of connector-strips which are a part of this educational device.

The fourth element, connector-strips, are shown in FIG. 7. Strip 71 has two apertures on each end that are horizontal. Strip 73 has two apertures that are spaced vertically. The cross-section of the two apertures are different in strip 72. In each case, however, there are no apertures in the middle of the strip. Apertures in the middle would result in confusion and frustration when machines are built.

The ends of building units are connected as shown in FIG. 7. Building units 76 and 77 are connected by strips 73 and 78 using linkages 79. If building units are to be connected in a perpendicular arrangement, special strips 74 and 75 are used.

Construction of Simple and Compound Machines

Figure 3:
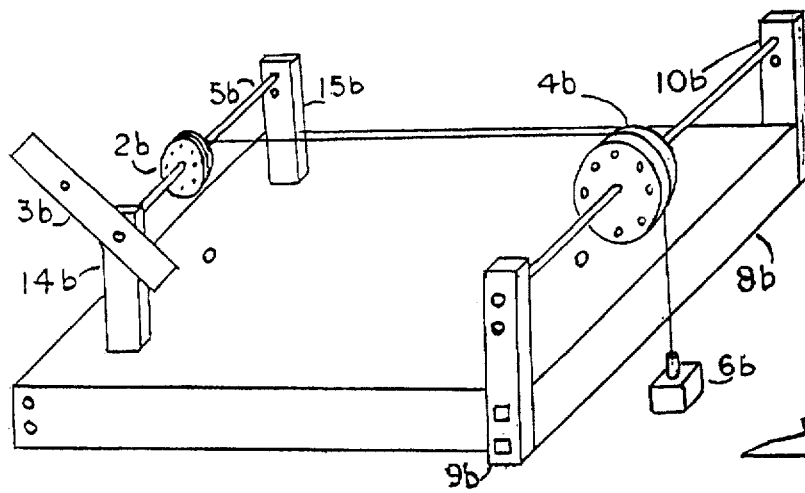
FIG. 3 is a compound machine that is built by uniting the pulley system shown in FIG. 3A with the wheel and axle system shown in FIG. 3B.

As the severely mentally handicapped person builds a lever, pulley, or a wheel and axle, the scientific concepts of "force", "weight", "distance", and "mechanical advantage" are being learned experientially. When the construction of these simple machine have been mastered, the student can proceed to the more complicated machine as shown in FIG. 3.

Figure 4:
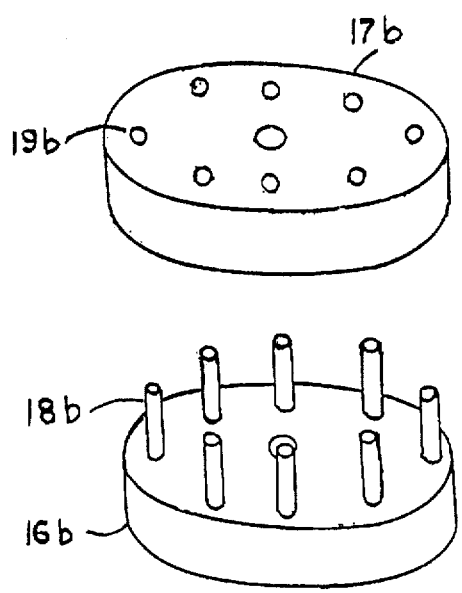
FIG. 4 shows how a wheel, pulley or gear is built by joining two cylindrical building units with linkages.

FIG. 4 shows how a wheel, pulley or gear is built using two cylindrical building units and linkages. Linkages 18b are inserted into the apertures in building unit 16b. The unit 17b then fits rigidly as these linkages are forced into apertures 19b.

Figure 3A:
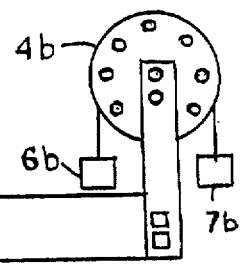
Figure 3B:
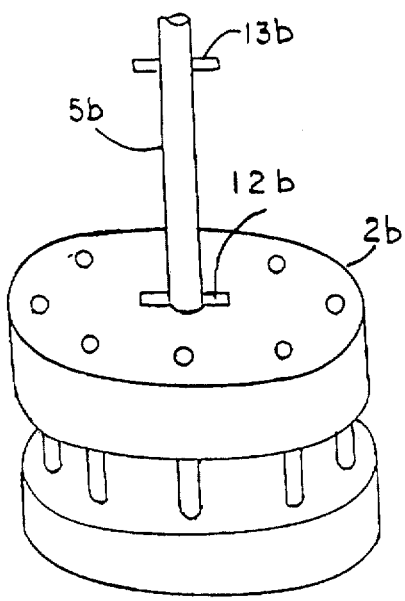

In FIG. 3B, a notch 12b is located in the center aperture of the wheel 2b. Linkage 5b with a small linkage on the axle, is forced into the aperture in order to fix the axle.

The special linkage-box makes it possible to form a pulley system on the right side and a wheel-axle system on the left side. Because of the predetermined alignment of the connector-strips and the apertures on the top surface of the box, these two systems automatically become a jointly operating system. In FIG. 3, the linkage 11b is inserted in the top aperture of connector-strip 9b. Pulley 4b slides on the linkage and the other end of the linkage fits into the aperture in the strip 10b. The wheel and axle shown in FIG. 3B, is then fitted between building units 14b and 15b. A building unit, 3b, is used as a crank to turn the wheel and axle and lift the weight 6b. The linkage-box , 8b, not only provides support for the total structure but also serves in building the machines.

FIG. 3A shows how the pulley system can be used to teach "cause and effect" relationships, "rotation", "clockwise vs. counter-clockwise direction" when the two building units 6b and 7b are raised or lowered.

In FIG. 1, a lever is constructed by using building unit 11 as a fulcrum. FIG. 1A shows how the connector-strips are connected to linkage-box 6. A linkage 1 has been inserted into apertures 2 and 4 of strip 3 and corresponding apertures in the linkage box, 6. The linkage 9 is inserted into aperture 10 of strip 3 and the unit 11 slides on. The other end of the linkage 9 is then inserted in the corresponding aperture in strip 8. Linkages 13 and 15 are inserted and used as the lever arms to which the weights, units 16 and 17, are attached. FIG. 1B shows how the linkages are joined to the fulcrum 11.

To test hypotheses and teach the concept of mechanical advantage, FIG. 2 shows a lever with the arm lengths in a ratio of 1 to 3. The lever is built on linkage-box 6a and the lever arms 7a and 8a are inserted into the fulcrum. The student sees, as well as builds, the system which balances three weights, units 2a, 3a, 4a, with only one unit 1a. FIG. 2A, shows how the units 2a and 3a are united vertically by linkage 5a.

Other structures such as crane, manually operated vehicle, residential or storage strucures can also be built from the same four elements.

What I claim is:

1. An educational building construction kit capable of being assembled and disassembled by the severely mentally retarded to form pulleys, gears, and simple and compound machines, that are used in the teaching of basic mechanics, the kit comprising:

a prefabricated linkage-box with at least two connector strips integrally attached thereto and having an end which extends beyond a top surface of said linkage-box, both of said linkage-box and said at least two connector strips having apertures located thereon;

a plurality of building units having apertures thereon;

a plurality of linkages, sized and configured to fit into said apertures of said linkage-box, said at least two connector strips and said plurality of building units, for rigidly connecting said linkage-box, said at least two connector strips and said plurality of building units together in a variety of configurations and combinations;

said at least two connector strips located parallel to each other on opposite sides of the linkage box, in exactly the same position on each of said opposite sides of said linkage-box;

said building units including a plurality of cylindrical units and a plurality of polyhedron units;

said plurality of cylindrical units each having a circumference on which a plurality of said apertures are located;

said plurality of polyhedron units each having at least one face with said apertures located thereon;

said apertures of said connector strips configured in a fixed spatial relationship defined by exactly two apertures on each end, the two apertures on one of said ends spaced from the two apertures of the other end of said ends, without any apertures in between;

said apertures of said linkage box are located on said top surface of said linkage-box and are configured in a fixed spatial relationship to each other and to said connector strips, the configuration of said apertures consisting of only one row of a plurality of apertures located in a line which is parallel to a line connecting said two connector strips; and wherein the fixed spatial relationships of the apertures of the linkage-box and connector strips are configured to limit the possible configurations and combinations of the construction kit to enable a severely mentally retarded person to properly connect said linkage-box and said at least two connector strips with said plurality of building units in a limited predetermined spaced relationship.

2. The educational building construction kit of claim 1, further comprising a plurality of panels mountable on the top or bottom surface of said linkage-box, wherein said panels are configured to be removed and replaced by each other, and wherein said panels have apertures with a same configuration as said apertures on the top surface of said linkage-box, however each of said apertures of said plurality of panels has differing diameter, shape or number.

* * * * *